(12) United States Patent
Gallimore

(10) Patent No.: US 10,060,480 B2
(45) Date of Patent: Aug. 28, 2018

(54) BEARING LOAD SHARING SYSTEM

(71) Applicant: ROLLS-ROYCE plc, London (GB)

(72) Inventor: Stephen Gallimore, Lincoln (GB)

(*) Notice: Subject to any disclaimer, the term of this patent is extended or adjusted under 35 U.S.C. 154(b) by 308 days.

(21) Appl. No.: 14/958,306

(22) Filed: Dec. 3, 2015

(65) Prior Publication Data
US 2016/0160928 A1    Jun. 9, 2016

(30) Foreign Application Priority Data

Dec. 9, 2014 (GB) .................................. 1421882.0

(51) Int. Cl.
| | |
|---|---|
| *F16C 41/02* | (2006.01) |
| *F16C 19/14* | (2006.01) |
| *F16C 19/54* | (2006.01) |
| *F01D 25/16* | (2006.01) |

(Continued)

(52) U.S. Cl.
CPC ............ *F16C 41/02* (2013.01); *F01D 25/16* (2013.01); *F01D 25/168* (2013.01); *F02C 7/06* (2013.01); *F16C 19/14* (2013.01); *F16C 19/545* (2013.01); *F16C 19/55* (2013.01); *F05D 2220/32* (2013.01); *F05D 2240/52* (2013.01); *F05D 2240/54* (2013.01); *F16C 19/547* (2013.01); *F16C 2360/23* (2013.01)

(58) Field of Classification Search
CPC ................ F16C 41/02; F16C 19/14; F16C 19/54–19/543; F16C 19/546–19/548; F16C 19/545; F01D 25/16; F01D 25/166; F01D 25/168; F05D 2220/32; F05B 2240/50; F05B 2240/52; F05B 2240/54; F02C 7/06

See application file for complete search history.

(56) References Cited

U.S. PATENT DOCUMENTS

| | | | |
|---|---|---|---|
| 3,382,670 | A | 5/1968 | Venable |
| 3,491,536 | A | 1/1970 | Hadaway |

(Continued)

FOREIGN PATENT DOCUMENTS

| | | |
|---|---|---|
| DE | 1 075 901 B | 2/1960 |
| GB | 1170382 A | 11/1969 |
| GB | 2 360 069 A | 9/2001 |

OTHER PUBLICATIONS

May 27, 2015 Search Report issued in British Patent Application No. GB1421882.0.

(Continued)

*Primary Examiner* — Logan Kraft
*Assistant Examiner* — Elton Wong
(74) *Attorney, Agent, or Firm* — Oliff PLC

(57) ABSTRACT

A bearing load sharing system comprising:
- first and second rotors extending in an axial direction;
- a first thrust bearing having an inner race and an outer race, the inner race connected to the first rotor;
- a second thrust bearing having an inner race and an outer race, the inner race connected to the second rotor; and
- an inter-rotor bearing having an inner race and an outer race, the inner race connected to one of the first and second rotor and the outer race connected to the other of the first and second rotor;
- wherein the outer race of the first bearing and/or the outer race of the second bearing is movable to vary the axial spacing between the outer races.

17 Claims, 8 Drawing Sheets

(51) Int. Cl.
*F16C 19/55* (2006.01)
*F02C 7/06* (2006.01)

(56) References Cited

U.S. PATENT DOCUMENTS

| | | | | |
|---|---|---|---|---|
| 2001/0009592 A1* | 7/2001 | Maquire | ............... | F01D 25/164 |
| | | | | 384/99 |
| 2005/0198941 A1* | 9/2005 | Bart | ..................... | F01D 25/162 |
| | | | | 60/226.1 |
| 2012/0195753 A1* | 8/2012 | Davis | ..................... | F01D 25/16 |
| | | | | 415/229 |
| 2013/0129504 A1* | 5/2013 | Heldner | ................. | F16C 19/54 |
| | | | | 415/229 |
| 2015/0125293 A1* | 5/2015 | Sheridan | ................ | F02C 3/107 |
| | | | | 415/229 |

OTHER PUBLICATIONS

May 2, 2016 Search Report issue in European Patent Application No. 15197697.

* cited by examiner

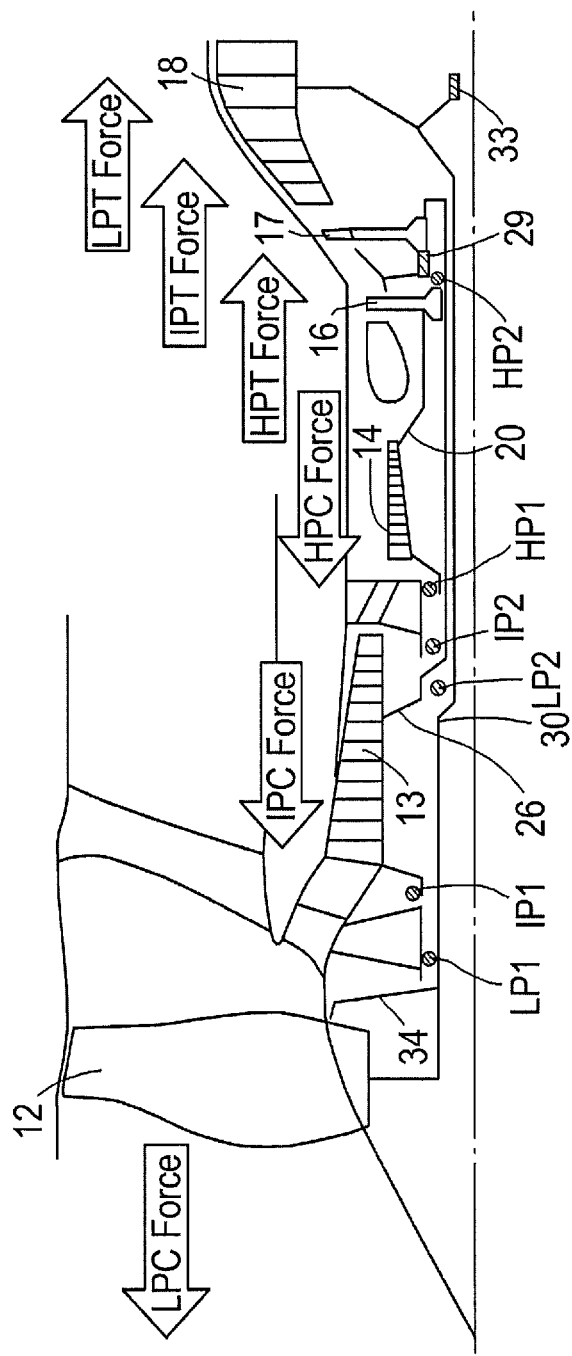

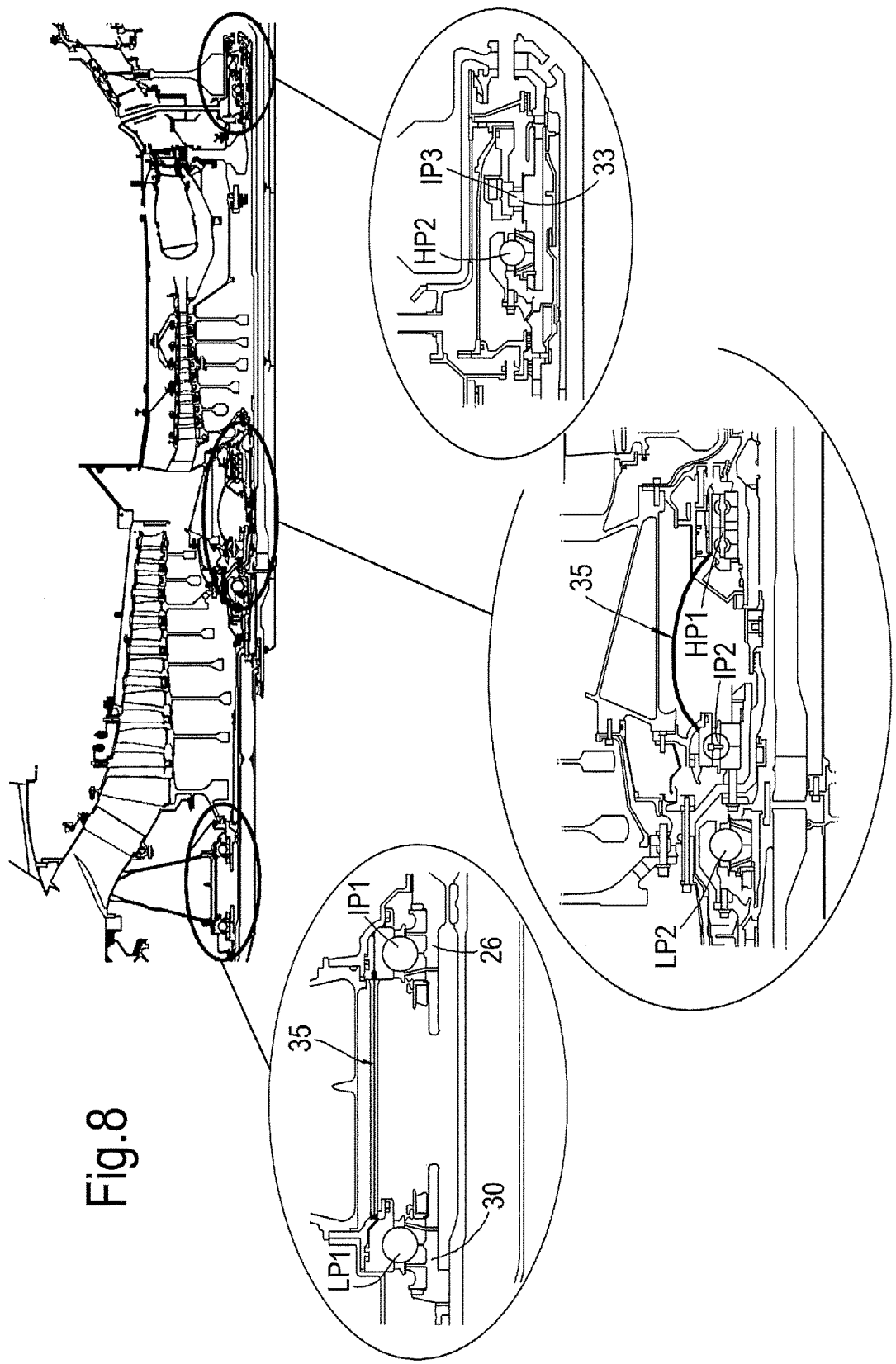

BEARING LOAD SHARING SYSTEM

TECHNOLOGICAL FIELD

The present disclosure relates to a bearing load sharing system for the management of axial thrust forces in bearings within a gas turbine engine.

BACKGROUND

With reference to FIGS. 1 and 2, a prior art ducted fan gas turbine engine is generally indicated at 10 and has a principal and rotational axis X-X. The engine comprises, in axial flow series, an air intake 11, a propulsive fan 12, an Intermediate Pressure (IP) compressor 13, a High Pressure (HP) compressor 14, combustion equipment 15, a High Pressure (HP) turbine 16, an Intermediate Pressure (IP) turbine 17, a Low Pressure (LP) turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the IP compressor 13 and a second air flow B which passes through the bypass duct 22 to provide propulsive thrust. The IP compressor 13 compresses the air flow A directed into it before delivering that air to the HP compressor 14 where further compression takes place.

The compressed air exhausted from the HP compressor 14 is directed into the combustion equipment 15 where it is mixed with fuel and the mixture combusted. The resultant hot combustion products then expand through, and thereby drive the HP, IP and LP turbines 16, 17, 18 before being exhausted through the nozzle 19 to provide additional propulsive thrust. The HP, IP and LP turbines respectively drive the HP and IP compressors 14, 13 and the fan 12 by suitable interconnecting rotors.

The outermost rotor is the High Pressure (HP) rotor 20 also known as the HP compressor drive cone. This rotor 20 connects the HP compressor 14 with the HP turbine 16. The HP rotor 20 is relatively large in diameter and short in length making it very stiff. Due to this stiffness, the HP rotor 20 can be supported on two bearings—a HP thrust ball bearing 24 at the front (upstream) carrying the thrust and an HP radial (roller) bearing 25 at the rear (downstream).

The next innermost rotor is the Intermediate Pressure (IP) rotor 26 which connects the IP compressor 13 to the IP turbine 17. This rotor 26 has a smaller diameter and is longer than the HP rotor 20 making it too flexible to only be supported at its ends. Therefore, three bearings are provided to support the IP shaft 26: an upstream IP radial bearing 27 in front of (upstream from) the IP compressor 13, an IP thrust bearing 28 aft of (downstream from) the IP compressor 13 and a downstream IP radial bearing 29 near the IP turbine 17.

Finally, the low pressure (LP) rotor 30 is innermost, connecting the LP turbine 18 to the fan 12. The LP rotor 30 is even longer and has an even smaller diameter than the IP rotor 26 and also requires support at three locations; a upstream LP radial bearing 31 aft of (downstream from) the fan 12, an LP thrust bearing 32 aft of (downstream from) the IP compressor 13 and a downstream LP radial bearing 33 aft of (downstream from) the LP turbine 18.

Thrust loads arise in a gas turbine engine as the result of pressure imbalances. For example, a compressor has a higher downstream pressure than upstream pressure which forces the compressor upstream (towards the intake) whereas a turbine has a higher upstream pressure than downstream pressure which forces the turbine downstream (towards the exhaust nozzle).

The LP, IP and HP rotors 20, 26, 30 are subjected to axial forces arising from the downstream forces generated by the turbines 16, 17, 18 and the upstream forces generated by the compressors 14, 13 or fan 12. Typically, a balance piston 34 is used to reduce the thrust load to a value that avoids overloading of the thrust bearings. However, the thrust loads remain high and uncertain.

The thrust loads are often at their maximum during the periods of highest power output for the engine. In a gas turbine engine providing jet propulsion for an aircraft, this period of maximized power output can occur when the aircraft is taking-off and/or climbing to a cruising altitude. The thrust loads can change direction (passing through a zero load point) during a flight cycle.

The thrust bearings can be positioned to support the rotors 20, 26, 30 against these thrust loads. A thrust bearing typically comprises an inner and outer race, a cage and a set of roller elements, the roller elements being spheres (or balls) which are contained within a raceway formed in one or both of the races with the cage maintaining the spacing between the balls.

It is known to use inter-rotor thrust bearings with one race connected to rotor and one race connected to another rotor to transfer loads between rotors. For example, the Rolls-Royce Trent 900, and Trent 1000 engines use a thrust bearing mounted between the IP and LP rotors to transfer axial forces on the LP rotor through the IP rotor to a thrust bearing mounted on the IP rotor.

There is a desire for an improved bearing load sharing system for the management of axial thrust forces in bearings on rotors within a gas turbine engine.

BRIEF SUMMARY

In a first aspect, there is provided a bearing load sharing system comprising:
first and second rotors extending in an axial direction;
a first thrust bearing having an inner race and an outer race, the inner race connected to the first rotor;
a second thrust bearing having an inner race and an outer race, the inner race connected to the second rotor; and
an inter-rotor bearing having an inner race and an outer race, the inner race connected to one of the first and second rotor and the outer race connected to the other of the first and second rotor;
wherein the outer race of the first bearing and/or the outer race of the second bearing is movable to vary the axial spacing between the outer races.

By providing outer races that are moveable relative to one another, it is possible to transfer axial load between the bearings on the two different rotors such that the load carried by each can be tailored to suit the physical and/or operational constraints on the rotors. The inter-rotor bearing transfers axial load between the two rotors. This allows the bearing with the greatest capacity to carry the greater load and, conversely, reduces the load on the bearing with the lower capacity (e.g. due to space or rotor speed constraints).

Optional features are set out below. These are applicable singly or in any combination with any aspect.

In some embodiments, the system further comprises:
a third rotor extending in an axial direction;
a third bearing having an inner race and an outer race, the inner race connected to the second rotor;

a fourth bearing having an inner race and an outer race, the inner race connected to the third rotor; and a second inter-rotor bearing having an inner race and an outer race, the inner race connected to one of the third and second rotors and the outer race connected to the other of the third and second rotors.

In these embodiments, the outer race of the first bearing and/or the outer race of the second bearing is movable to vary the axial spacing between the outer races of the first and second bearings and the outer race of the third and/or fourth bearing may be moveable to vary the axial spacing between the outer races of the third and fourth bearings.

In a first specific embodiment, the first rotor is a low pressure (LP) rotor extending from an upstream fan to a downstream low pressure turbine and the second rotor is an intermediate pressure (IP) rotor extending from an upstream IP compressor to a downstream IP turbine. In this embodiment, the first bearing is a low pressure load-share thrust bearing (LP1) and the second bearing is a first intermediate pressure load-share thrust bearing (IP1).

In this way, axial forces on the LP and IP rotors are shared between the LP1 and IP1 thrust bearings. Where the LP1 and IP1 thrust bearings are joined by a hydraulic connection, the force transfer can be varied in proportion to the effective piston areas of the outer races. If the effective piston areas are equal, the axial loads will be equally shared between the LP1 and IP1 thrust bearings.

The IP1 thrust bearing may be downstream from the LP1 thrust bearing.

The LP1 thrust bearing may be positioned on the LP rotor proximal the fan.

The IP1 thrust bearing may be positioned on the IP rotor at the upstream axial end of the IP compressor.

The LP1 thrust bearing and IP1 thrust bearing may be substantially axially aligned.

The system further comprises a low pressure inter-rotor thrust bearing (LP2) which comprises an inner race connected to one of the LP rotor/IP rotor and an outer race connected to the other of the LP rotor/IP rotor.

Thus the LP1 and LP2 thrust bearings are connected through the LP rotor and the axial load on the LP rotor can be shared by the LP1 and the LP2 bearings. Furthermore, thrust loads can be shared between the LP1 and IP1 thrust bearings through the LP2 inter-rotor thrust bearing.

The LP2 thrust bearing may be downstream from the LP1 thrust bearing i.e. closer to the low pressure turbine than the LP1 thrust bearing.

The LP2 thrust bearing may be positioned on the LP rotor proximal the downstream axial end of the IP compressor.

In a second specific embodiment, the first rotor is a high pressure (HP) rotor extending from an upstream high pressure compressor to a downstream high pressure turbine and the second rotor is an intermediate pressure (IP) rotor extending from an upstream IP compressor to a downstream IP turbine. In this aspect, the first bearing is a high pressure load-share thrust bearing (HP1) and the second bearing is an intermediate pressure load-share thrust bearing (IP2). The HP1 thrust bearing may be a single row bearing or a stacked, multiple row bearing.

The HP1 thrust bearing may be downstream from the IP2 thrust bearing.

The HP1 thrust bearing may be positioned on the HP rotor proximal and upstream from the high pressure compressor.

The IP2 thrust bearing may be positioned on the IP rotor proximal the downstream axial end of the IP compressor The HP1 thrust bearing and IP2 thrust bearing may be substantially axially aligned.

The system further comprises a high pressure inter-rotor thrust bearing (HP2) which comprises an inner race connected to one of the IP rotor/HP rotor and an outer race connected to the other of the IP rotor/HP rotor. Thus the HP1 and HP2 thrust bearings are connected through the HP rotor and the axial load on the HP rotor can be shared by the HP1 and the HP2 bearings. Furthermore, thrust loads can be shared between the HP1 and IP2 thrust bearings through the HP2 inter-rotor thrust bearing.

The HP2 bearing may be downstream from the HP1 thrust bearing.

The HP2 bearing may be mounted proximal the HP turbine.

The system may further comprise a low pressure inter-rotor thrust bearing (LP2) which comprises an inner race connected to a third LP rotor and an outer race connected to the IP rotor.

The LP2 thrust bearing may be upstream from the IP2 thrust bearing i.e. closer to the fan than the IP1 thrust bearing.

The LP2 thrust bearing may be positioned on the LP rotor proximal the downstream axial end of the IP compressor.

In a third specific embodiment (which is a combination of the first and second specific embodiments), the first rotor is a low pressure (LP) rotor extending from an upstream fan to a downstream LP turbine, the second rotor is an intermediate pressure (IP) rotor extending from an upstream IP compressor to a downstream IP turbine and the third rotor is a high pressure (HP) rotor extending from an upstream HP compressor to a downstream HP turbine.

The first bearing is a low pressure lead-share thrust bearing (LP1), the second bearing is a first intermediate load-share pressure bearing (IP1), the third bearing is a second intermediate pressure load-share bearing (IP2) and the fourth bearing is a high pressure load share-thrust bearing (HP1).

In these embodiments, the axial thrust forces are shared between all three rotors.

The locations and relative positions of the LP1, IP1, IP2 and HP1 thrust bearings may be as described above for the first and second specific embodiments.

Further LP2 (inter-rotor) and HP2 (inter-rotor) bearings as described for the first and second specific embodiments may also be provided.

The thrust bearings in any of the previously described embodiments may be thrust ball bearings i.e. they each comprise a set of balls/spheres contained within their respective inner and outer races.

The outer races of the first and second bearings and/or the third and fourth bearings in any of the previously described embodiments may be flexibly connected e.g. by a hydraulic connection to effect movement of one or both of the outer races (which act as pistons on the fluid in the hydraulic connection) to vary the distance therebetween.

The outer races of the first and second bearings and/or the third and fourth bearings in any of the previously described embodiments may flexibly connected e.g. by a compliant element such as a diaphragm or spring so as be moveable relative to one another upon deformation of the compliant element.

In a second aspect, there is provided a gas turbine engine having a system according to any of the embodiments described above.

BRIEF DESCRIPTION

Embodiments will now be described by way of example with reference to the accompanying drawings in which:

FIGS. 7 and 8 show an axial cross-section through a portion of a gas turbine engine having a bearing load share system according to a third embodiment.

DETAILED DESCRIPTION

Figure 1:
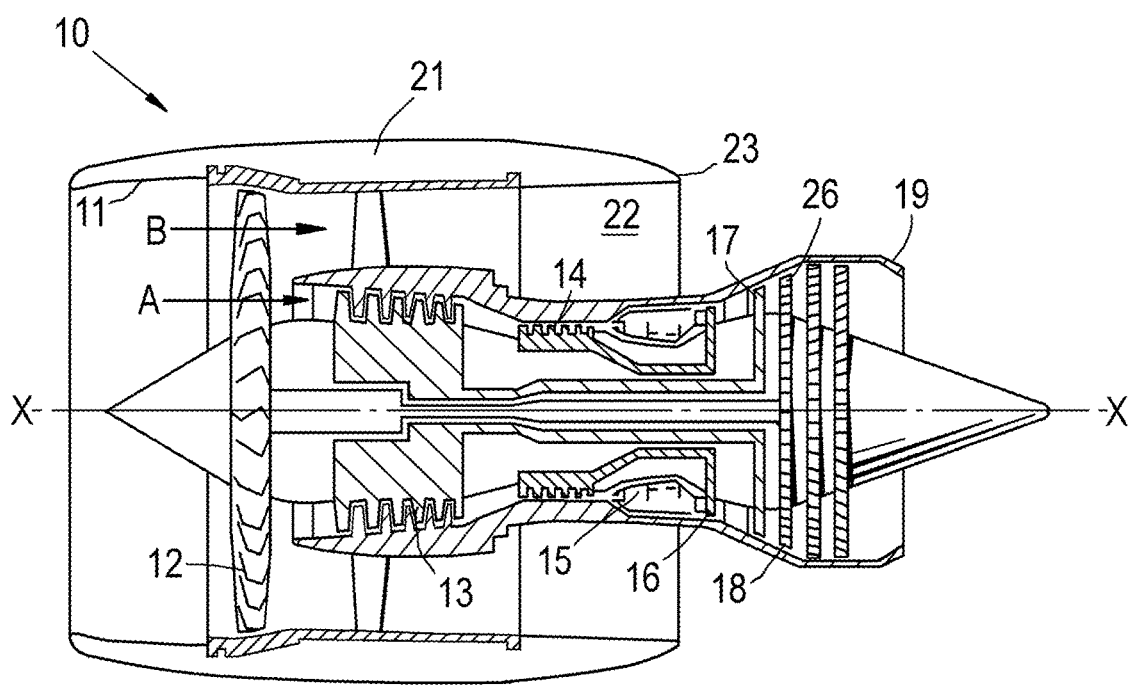
FIG. 1 shows a prior art ducted fan gas turbine engine.
Figure 2:
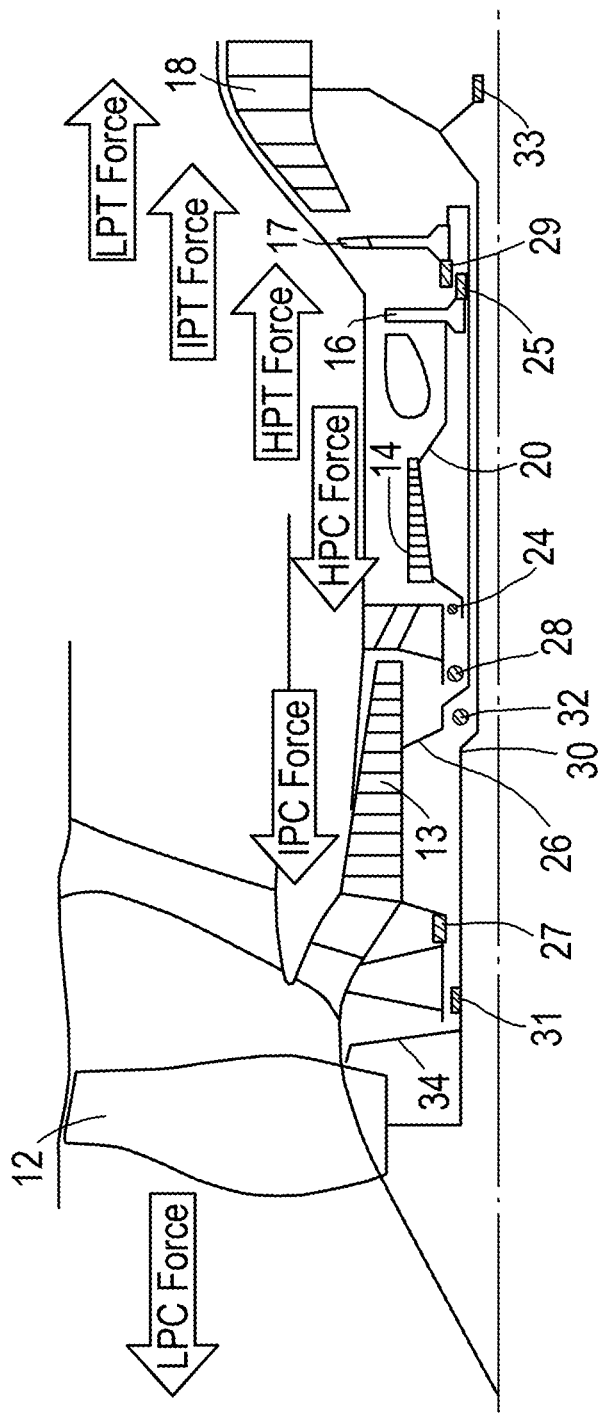
FIG. 2 shows an axial cross-section through a portion of a prior art ducted fan gas turbine engine.
Figure 3:
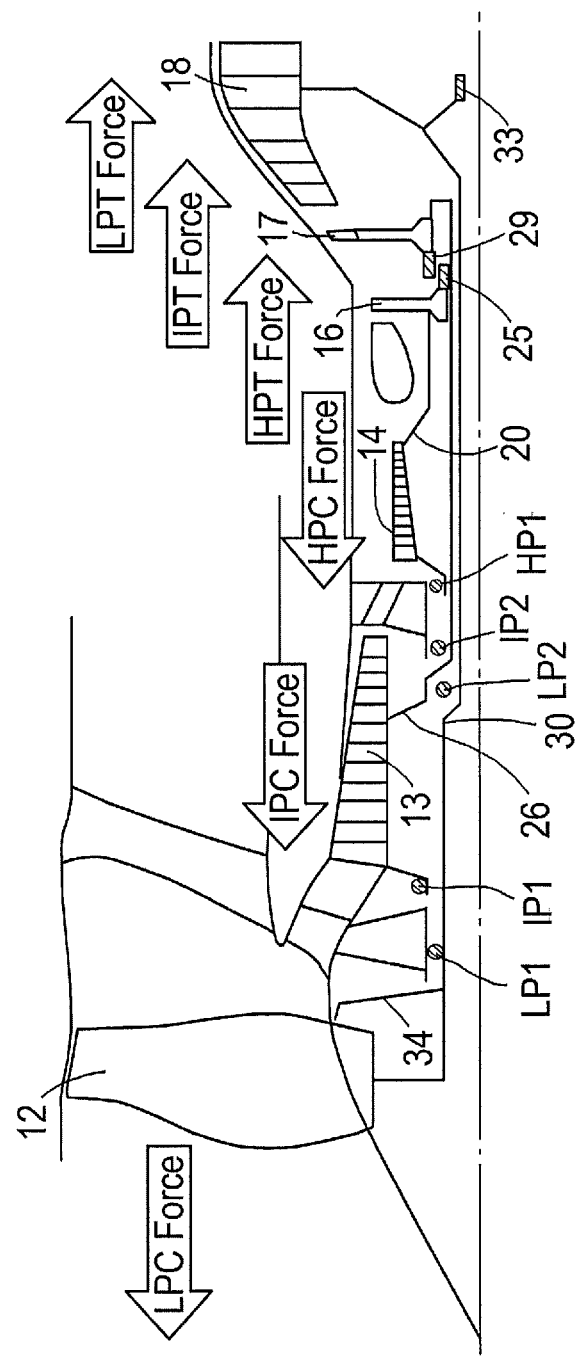
FIGS. 3 and 4 show an axial cross-section through a portion of a gas turbine engine having a bearing load share system according to a first embodiment.
Figure 4:
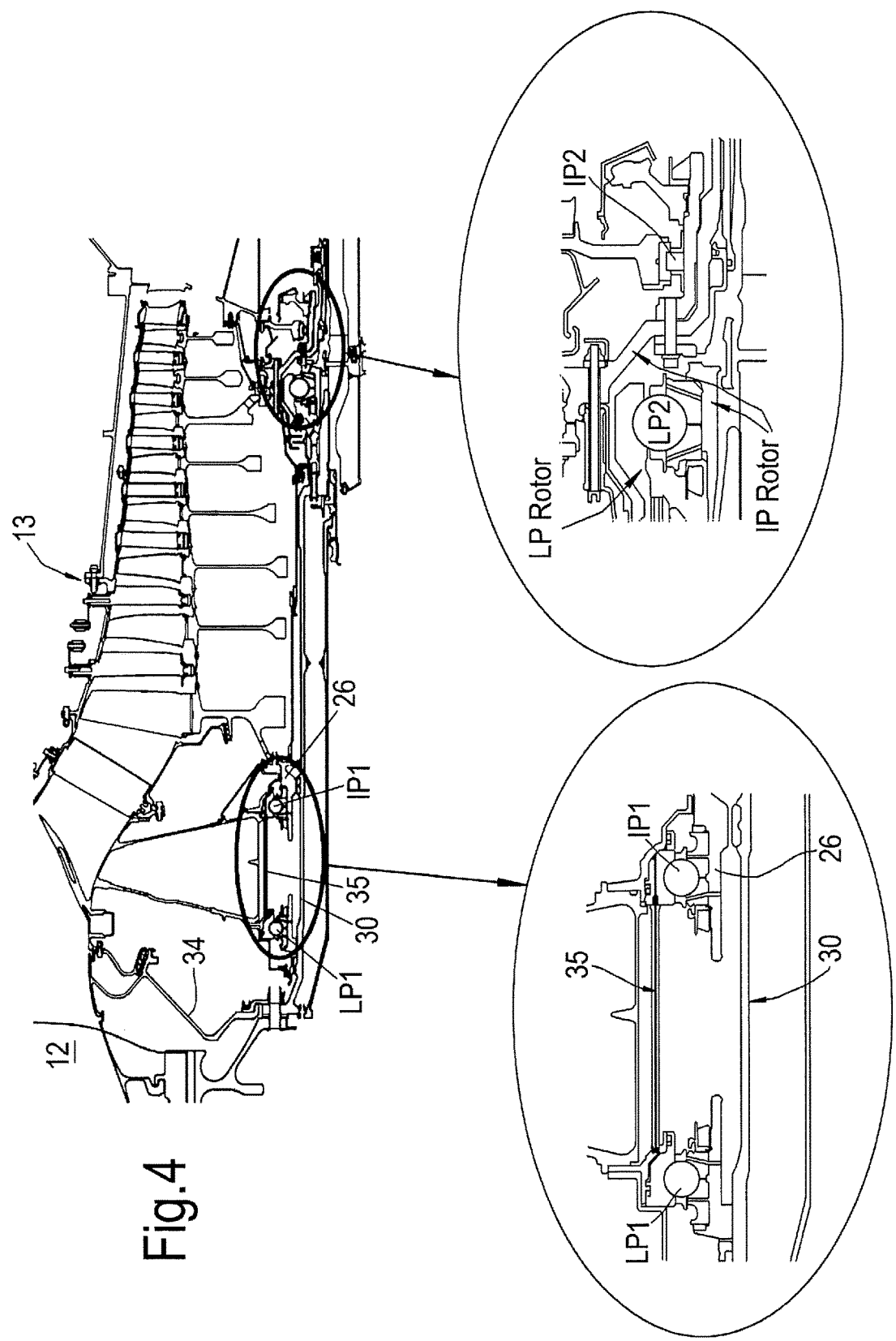

FIGS. 3 and 4 show an axial cross-section through a gas turbine engine having a bearing load sharing system according to a first embodiment.

The gas turbine engine comprises three concentric rotors.

The innermost rotor is the low pressure (LP) rotor 30 and this connects the LP turbine 18 to the fan 12. The LP rotor 30 is the longest rotor and has the smallest diameter.

The next innermost rotor is the Intermediate Pressure (IP) rotor 26 which connects the IP compressor 13 to the IP turbine 17. This rotor 26 has a smaller diameter and is longer than the outermost rotor which is the High Pressure (HP) rotor 20 also known as the HP compressor drive cone. This HP rotor 20 connects the HP compressor 14 with the HP turbine 16.

The bearing load sharing system comprises a low pressure load share thrust bearing (LP1) having an inner race and an outer race, the inner race connected to the LP rotor 30.

The bearing load sharing system further comprises an intermediate pressure load share thrust bearing (IP1) having an inner race and an outer race, the inner race connected to the IP rotor 26.

The IP1 thrust bearing is downstream from the LP1 thrust bearing.

The LP1 thrust bearing is positioned on the LP rotor 30 proximal the fan 12 and the IP1 thrust bearing is positioned on the IP rotor 26 at the upstream axial end of the IP compressor 13.

The outer races of the LP1 thrust bearing and IP1 thrust bearing are flexible joined via a hydraulic connection 35 such that the outer race of the LP1 thrust bearing and/or the outer race of the IP1 thrust bearing is movable to vary the axial spacing between their outer races.

By providing outer races that are moveable relative to one another, it is possible to transfer axial load between the LP1 and IP1 thrust bearings on the LP and IP rotors such that the load carried by each can be tailored to suit the physical and/or operational constraints on the rotors. This allows the bearing with the greatest capacity to carry the greater load and, conversely, reduces the load on the bearing with the lower capacity (e.g. due to space or rotor speed constraints). Where the LP1 and IP1 thrust bearings are joined by a hydraulic connection 35, the force transfer can be varied in proportion to the effective piston areas of the outer races. If the effective piston areas are equal, the axial loads will be equally shared between the LP1 and IP1 thrust bearings.

The system further comprises a low pressure inter-rotor thrust bearing (LP2) which comprises an inner race connected to the LP rotor 30 and an outer race connected to the IP rotor 26. Thus, axial loads can be transferred between the LP and IP rotors 30, 26 through the LP2 inter-rotor bearing. The load on the LP2 bearing will be the difference between the thrust loads applied to the LP and IP rotors 30, 26.

The LP2 bearing is downstream from the LP1 thrust bearing i.e. closer to the LP turbine 18 than the LP1 thrust bearing.

The LP2 bearing is positioned on the LP rotor 30 proximal the downstream axial end of the IP compressor 13.

The system further comprises a low pressure radial bearing 33 which comprises an inner race connected to the LP rotor.

The low pressure radial bearing 33 is downstream from the LP2 bearing and is positioned on the LP rotor 30 proximal the LP turbine 18.

The system further comprises an intermediate pressure radial bearing (IP2) which comprises an inner race connected to the IP rotor 26.

The IP2 thrust bearing is downstream from the IP1 thrust bearing i.e. closer to the IP turbine 17 than the IP1 thrust bearing and is positioned on the IP rotor 26 proximal the upstream axial end of the IP compressor 13.

The system further comprises a downstream intermediate pressure radial bearing (IP3) having an inner race connected to the IP rotor 26.

The IP3 bearing is downstream from the IP2 thrust bearing and is mounted on the IP rotor 26 proximal the IP turbine 17.

Figure 5:
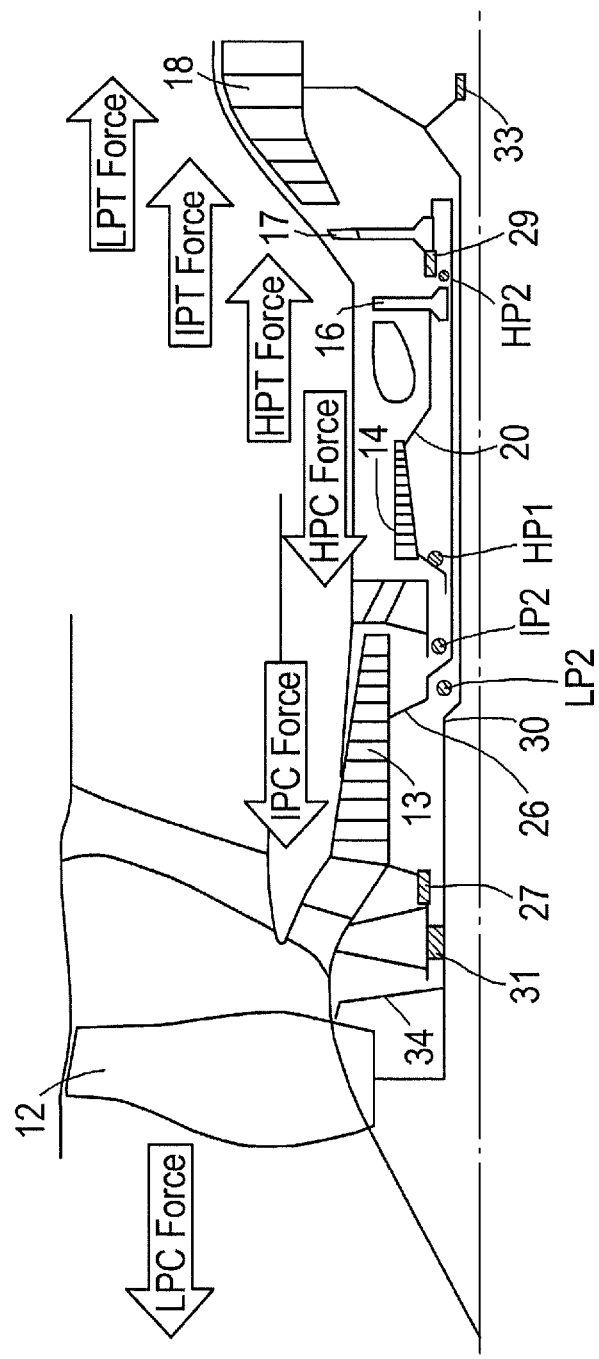
FIGS. 5 and 6 show an axial cross-section through a portion of a gas turbine engine having a bearing load share system according to a second embodiment.
Figure 6:
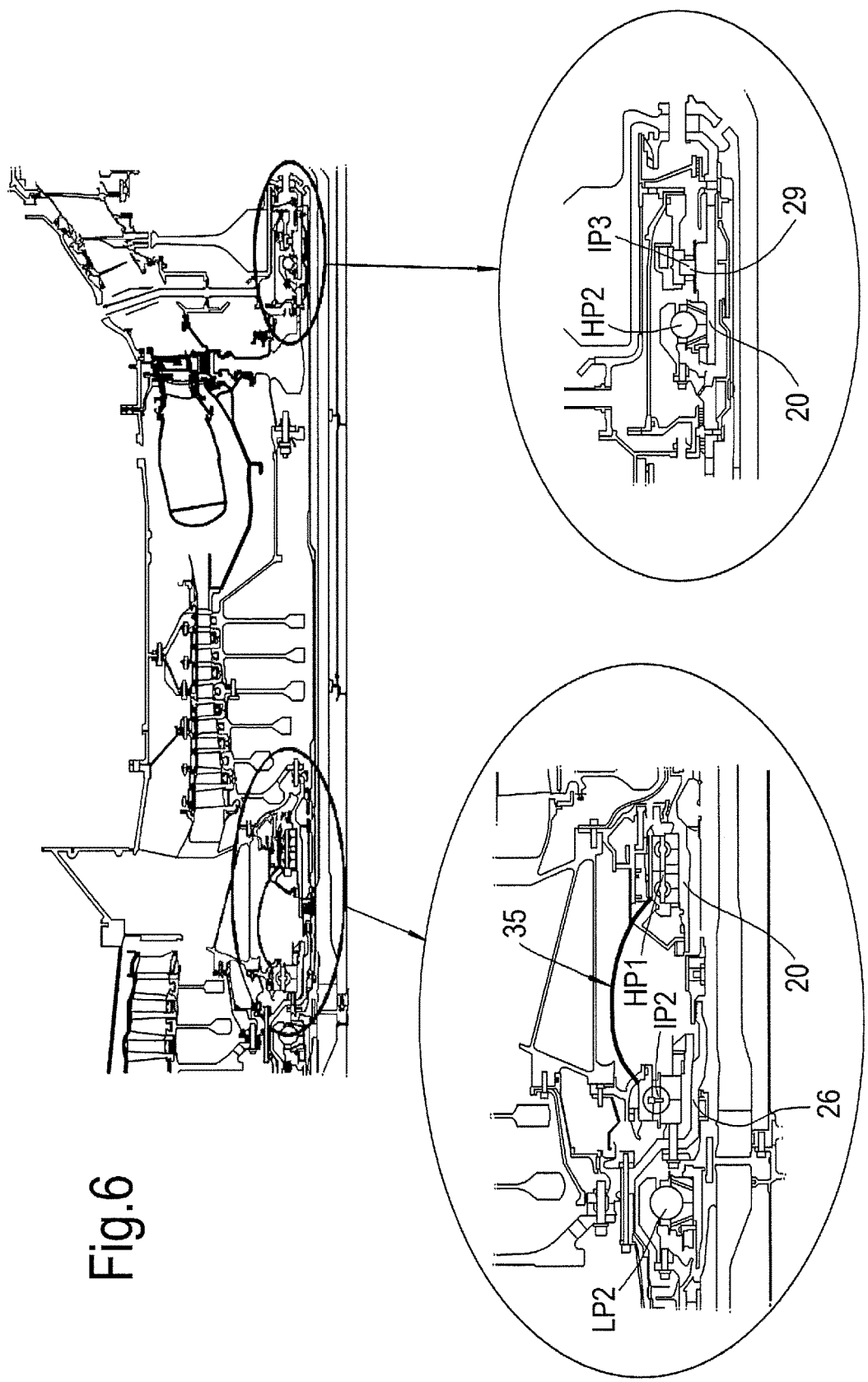

FIGS. 5 and 6 show an axial cross-section through a gas turbine engine having a bearing load sharing system according to a second embodiment.

In this embodiment, the system comprises a high pressure load-share thrust bearing (HP1) having an inner race connected to the HP rotor 20 and an intermediate pressure load-share thrust bearing (IP2) having an inner race connected to the IP rotor 26.

In this embodiment, the total IP and HP forces are split between the IP2 and HP1 bearings, The HP1 thrust bearing is a stacked, multiple row bearing.

The HP1 thrust bearing may be downstream from the IP2 thrust bearing.

The HP1 thrust bearing is positioned on the HP rotor 20 proximal and upstream from the high pressure compressor 14 and the IP2 thrust bearing is positioned on the IP rotor 26 proximal the downstream axial end of the IP compressor 13.

The HP1 thrust bearing and IP2 thrust bearing are substantially axially aligned.

The system further comprises a high pressure inter-rotor thrust bearing (HP2) which comprises an inner race connected to the IP rotor 26 and an outer race connected to the HP rotor 30. This allows transfer of axial load on the HP rotor to the IP rotor and vice versa.

The HP2 bearing is downstream from the HP1 thrust bearing and is mounted proximal the HP turbine 16.

FIGS. 7 and 8 show an axial cross-section through a gas turbine engine having a bearing load sharing system according to a third embodiment. This embodiment is a combination of the first and second embodiments described above.

The first rotor is the low pressure (LP) rotor 30, the second rotor is the intermediate pressure (IP) rotor 26 and the third rotor is the high pressure (HP) rotor 20.

The first bearing is the low pressure bearing (LP1), the second bearing is a first intermediate pressure bearing (IP1), the third bearing is a second intermediate pressure load-share bearing (IP2) and the fourth bearing is the high pressure load share-thrust bearing (HP1).

In this embodiment, the LP, IP and HP thrust loads are shared between all three rotors The locations and relative positions of the LP1, IP1, IP2 and HP1 thrust bearings are as described above for the first and second embodiments.

The system further comprises a high pressure inter-rotor thrust bearing (HP2) which comprises an inner race connected to the IP rotor 26 and an outer race connected to the HP rotor 30 and a low pressure inter-rotor thrust bearing (LP2) which comprises an inner race connected to the IP rotor 26 and an outer race connected to the LP rotor 30.

The locations and relative positions of the HP2 and LP2 thrust bearings are as described for the first and second embodiments.

While the bearing load sharing system has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the scope of the claims.

All references referred to above are hereby incorporated by reference.

What is claimed is:

1. A bearing load sharing system comprising:
    first and second rotors extending in an axial direction;
    a first thrust bearing having an inner race and an outer race, the inner race connected to the first rotor;
    a second thrust bearing having an inner race and an outer race, the inner race connected to the second rotor; and
    an inter-rotor bearing having an inner race and an outer race, the inner race connected to one of the first and second rotor and the outer race connected to the other of the first and second rotor;
    wherein at least one of the outer race of the first thrust bearing and the outer race of the second thrust bearing is movable to vary axial spacing between the outer race of the first thrust bearing and the outer race of the second thrust bearing so as to transfer axial load between the first thrust bearing on the first rotor and the second thrust bearing on the second rotor.

2. The system according to claim 1 wherein:
    the first rotor is a low pressure rotor extending from an upstream fan to a downstream low pressure turbine;
    the second rotor is an intermediate pressure rotor extending from an upstream intermediate pressure compressor to a downstream intermediate pressure turbine;
    the first thrust bearing is a low pressure load-share thrust bearing (LP1); and
    the second thrust bearing is a first intermediate pressure load-share thrust bearing (IP1).

3. The system according to claim 2 wherein the intermediate pressure load-share thrust bearing (IP1) is downstream from the low pressure load-share thrust bearing (LP1).

4. The system according to claim 3 wherein the low pressure load-share thrust bearing (LP1) is positioned on the low pressure rotor proximal the fan and the intermediate pressure load-share thrust bearing (IP1) is positioned on the intermediate rotor at the upstream axial end of the intermediate pressure compressor.

5. The system according to claim 2 wherein the low pressure load-share thrust bearing (LP1) and the intermediate pressure load-share thrust bearing (IP1) are substantially axially aligned.

6. The system according to claim 2 wherein the inter-rotor bearing is a low pressure inter-rotor thrust bearing (LP2), the inner race of the inter-rotor bearing is connected to the low pressure rotor, and the outer race of the inter-rotor bearing is connected to the intermediate pressure rotor.

7. The system according to claim 1 wherein:
    the first rotor is a high pressure rotor extending from an upstream high pressure compressor to a downstream high pressure turbine;
    the second rotor is an intermediate pressure rotor extending from an upstream intermediate pressure compressor to a downstream intermediate pressure turbine;
    the first thrust bearing is a high pressure load-share thrust bearing (HP1); and
    the second thrust bearing is an intermediate pressure load-share thrust bearing (IP2').

8. The system according to claim 7 wherein the high pressure load-share thrust bearing (HP1) is downstream from the intermediate pressure load-share thrust bearing (IP2').

9. The system according to claim 8 wherein the high pressure load-share thrust bearing (HP1) is positioned on the high pressure rotor proximal and upstream from the high pressure compressor and the intermediate pressure load-share thrust bearing (IP2') is positioned on the intermediate pressure rotor proximal the downstream axial end of the intermediate pressure compressor.

10. The system according to claim 7 wherein the high pressure load-share thrust bearing (HP1) and the intermediate pressure load-share bearing (IP2') are substantially axially aligned.

11. The system according to claim 7 wherein the inter-rotor bearing is a high pressure inter-rotor thrust bearing (HP2), the inner race of the inter-rotor bearing is connected to the intermediate pressure rotor, and the outer race of the inter-rotor bearing is connected to the high pressure rotor.

12. A gas turbine engine having the bearing load sharing system according to claim 1.

13. The system according to claim 1 wherein the outer races of the first and second thrust bearings are flexibly connected by a hydraulic connection to effect movement of the at least one of the outer race of the first thrust bearing and the outer race of the second thrust bearing.

14. A bearing load sharing system comprising:
    first and second rotors extending in an axial direction;
    a first thrust bearing having an inner race and an outer race, the inner race connected to the first rotor;
    a second thrust bearing having an inner race and an outer race, the inner race connected to the second rotor;
    an inter-rotor bearing having an inner race and an outer race, the inner race connected to the first rotor and the outer race connected to the second rotor;
    a third rotor extending in an axial direction;
    a third bearing having an inner race and an outer race, the inner race connected to the second rotor;
    a fourth bearing having an inner race and an outer race, the inner race connected to the third rotor; and
    a second inter-rotor bearing having an inner race and an outer race, the inner race connected to the second rotor, and the outer race connected to the third rotor,
    wherein at least one of the outer race of the first thrust bearing and the outer race of the second thrust bearing is movable to vary axial spacing between the outer race of the first thrust bearing and the outer race of the second thrust bearing so as to transfer axial load between the first thrust bearing on the first rotor and the second thrust bearing on the second rotor.

15. The system according to claim 14 wherein:
    the first rotor is a low pressure rotor extending from an upstream fan to a downstream low pressure turbine;
    the second rotor is an intermediate pressure rotor extending from an upstream intermediate pressure compressor to a downstream intermediate pressure turbine;

the third rotor is a high pressure rotor extending from an upstream high pressure compressor to a downstream high pressure turbine;

the first thrust bearing is a low pressure load-share thrust bearing (LP1);

the second thrust bearing is a first intermediate pressure load-share thrust bearing (IP1);

the third bearing is a second intermediate pressure load-share bearing (IP2'); and the fourth bearing is a high pressure load-share thrust bearing (HP1).

16. The system according to claim 14 wherein the outer races of the first and second thrust bearings and/or the third and fourth bearings are flexibly connected by a hydraulic connection to effect movement of one or both of the outer races.

17. The system according to claim 14 wherein the outer races of the first and second thrust bearings and/or the third and fourth bearings are flexibly connected by a compliant element to effect movement of one or both of the outer races.

* * * * *